US012357977B2

(12) United States Patent
Eich

(10) Patent No.: US 12,357,977 B2
(45) Date of Patent: Jul. 15, 2025

(54) PLATINUM AND ZINC-CONTAINING ZEOLITE

(71) Applicant: UMICORE AG & CO. KG, Hanau-Wolfgang (DE)

(72) Inventor: Andreas Eich, Gelnhausen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 102 days.

(21) Appl. No.: 17/906,381

(22) PCT Filed: Mar. 24, 2021

(86) PCT No.: PCT/EP2021/057519
§ 371 (c)(1),
(2) Date: Sep. 15, 2022

(87) PCT Pub. No.: WO2021/191246
PCT Pub. Date: Sep. 30, 2021

(65) Prior Publication Data
US 2023/0130261 A1 Apr. 27, 2023

(30) Foreign Application Priority Data
Mar. 24, 2020 (EP) ..................... 20165113

(51) Int. Cl.
| | | |
|---|---|---|
| *B01J 29/74* | (2006.01) | |
| *B01D 53/94* | (2006.01) | |
| *B01J 29/18* | (2006.01) | |
| *B01J 29/40* | (2006.01) | |
| *B01J 29/50* | (2006.01) | |
| *B01J 29/67* | (2006.01) | |
| *F01N 3/08* | (2006.01) | |
| *F01N 3/20* | (2006.01) | |
| *F01N 3/28* | (2006.01) | |

(52) U.S. Cl.
CPC ........ *B01J 29/743* (2013.01); *B01D 53/9436* (2013.01); *B01J 29/67* (2013.01); *B01J 29/74* (2013.01); *F01N 3/0842* (2013.01); *F01N 3/2066* (2013.01); *F01N 3/2803* (2013.01); *B01D 2255/1021* (2013.01); *B01D 2255/20792* (2013.01); *B01D 2255/50* (2013.01); *B01J 29/185* (2013.01); *B01J 29/405* (2013.01); *B01J 29/505* (2013.01); *F01N 3/0814* (2013.01); *F01N 2250/12* (2013.01); *F01N 2330/02* (2013.01); *F01N 2370/02* (2013.01); *F01N 2370/04* (2013.01)

(58) Field of Classification Search
CPC ...... F01N 3/0814; F01N 3/0842; F01N 3/106; F01N 3/2066; F01N 3/28; F01N 3/2803; F01N 3/2842; F01N 2250/12; F01N 2330/02; F01N 2370/02; F01N 2370/04; F01N 2570/14; F01N 2570/18; B01J 29/043; B01J 29/085; B01J 29/185; B01J 29/405; B01J 29/505; B01J 29/605; B01J 29/655; B01J 29/7015; B01J 29/7049; B01J 29/7065; B01J 29/723; B01J 29/743; B01J 29/67; B01J 29/74; B01D 53/9436; B01D 2253/104; B01D 2253/106; B01D 2253/108; B01D 2253/1085; B01D 2255/1021; B01D 2255/20792; B01D 2255/50; B01D 2255/502; B01D 2255/504; B01D 2258/012; Y02T 10/12

See application file for complete search history.

(56) References Cited

U.S. PATENT DOCUMENTS

| | | | |
|---|---|---|---|
| 3,959,116 A | 5/1976 | Arey, Jr. et al. | |
| 5,120,695 A | 6/1992 | Blumrich et al. | |
| 9,937,489 B2 | 4/2018 | Larsson | |
| 10,589,261 B2 | 3/2020 | Larsson | |
| 10,737,252 B2 | 8/2020 | Chen et al. | |
| 2004/0209769 A1 | 10/2004 | Demel et al. | |
| 2018/0117573 A1* | 5/2018 | Fedeyko | B01J 29/78 |
| 2018/0280945 A1 | 10/2018 | Greenham et al. | |
| 2019/0060833 A1* | 2/2019 | Hoke | B01J 23/63 |
| 2019/0134617 A1* | 5/2019 | Lin | B01J 35/56 |
| 2019/0300375 A1* | 10/2019 | Mcguire | B01D 53/9418 |
| 2020/0055035 A1* | 2/2020 | Zheng | B01J 37/0215 |
| 2020/0206723 A1* | 7/2020 | Petrovic | B01J 29/76 |
| 2022/0001371 A1* | 1/2022 | Li | B01J 37/0036 |

FOREIGN PATENT DOCUMENTS

| | | |
|---|---|---|
| CN | 107282090 A | 10/2017 |
| DE | 1 545 293 | 1/1970 |
| DE | 10 2016 111 147 A1 | 12/2016 |
| EP | 0 410 440 A1 | 1/1991 |
| EP | 2 604 590 A1 | 6/2013 |
| EP | 2 117 702 B1 | 11/2020 |
| GB | 2552262 A | 1/2018 |
| JP | H06-198190 A | 7/1994 |

(Continued)

OTHER PUBLICATIONS

International Search Report dated May 26, 2021 for International Patent Application No. PCT/EP2021/057519 (4 pages in German with English translation).
Written Opinion of the International Searching Authority dated May 26, 2021 for International Patent Application No. PCT/EP2021/057519 (6 pages in German).
European Extended Search Report mailed Sep. 4, 2020 for European Patent Application No. 20165113.0 (8 pages in German with translation).
Baerlocher, Ch., et al. Atlas of Zeolite Framework Types, Elsevier, 2001. Published on behalf of the Structure Commission of the International Zeolite Association (306 pages).
Rasouli, Milad et al. Synthesis and Characterization of Platinum Impregnated Zn-ZSM5. Nanocatalysts for Xylene Isomerization Reactions. Catalysis Letters. 2018.vol. 148, pp. 2325-2336.

(Continued)

*Primary Examiner* — Binh Q Tran
(74) *Attorney, Agent, or Firm* — Smith, Gambrell & Russell, LLP

(57) ABSTRACT

The present invention relates to a zeolite comprising zinc and platinum, and to a catalyst containing said zeolites.

20 Claims, No Drawings

(56) References Cited

FOREIGN PATENT DOCUMENTS

| | | | |
|---|---|---|---|
| JP | 2013-163647 | A | 8/2013 |
| JP | 2014-046277 | A | 3/2014 |
| JP | 2020-500136 | A | 1/2020 |
| WO | 02/100520 | A1 | 12/2002 |
| WO | 2010/062730 | A2 | 6/2010 |
| WO | 2014/196211 | A1 | 12/2014 |

OTHER PUBLICATIONS

Liu, Baoyu et al. The effect of oxidation of ethane to oxygenates on Pt- and Zn-containing LTA zeolites with tunable selectivity. Journal of Energy Chemistry. 2019. vol. 30, pp. 42-48.

Translation of the Written Opinion of the International Searching Authority mailed May 26, 2021 for International Patent Application No. PCT/EP2021/057519 (5 Pages).

International Preliminary Report on Patentability mailed Sep. 22, 2022 for International Patent Application No. PCT/EP2021/057519 (7 Pages in German; 6 pages English Translation).

Extended European Search Report mailed Sep. 4, 2020 for European Patent Application No. 20 165 113.0 (8 Pages in German; 8 pages English Translation).

Examination Report mailed Aug. 8, 2024 for European Patent Application No. 20 165 113.0 (5 Pages in German; 5 pages English Translation).

Examination Report mailed Aug. 9, 2024 for European Patent Application No. 21 713 043.4 (6 Pages in German; 6 pages English Translation).

Liu, Ping, et al., A Highly Efficient HB Zeolite Supported Pt Catalyst Promoted by Chromium for the Hydroisomerization of n-Heptane. Catalysis Letters. 2008,. Vol. 126, No. 3-4, pp. 346-352.

Liu, Ping, et al. Rare Earth Metals Ion-exchanged B-Zeolites as Supports of Platinum Catalysts for Hydroisomerization of n-Heptane. Chinese Journal of Chemical Engineering. 2011. Vol. 19, No. 2, pp. 278-284.

Japanese Office Action mailed Mar. 25, 2025 for Japanese Patent Application No. 2022-557925 (5 pages in Japanese, 6 pages English translation).

* cited by examiner

PLATINUM AND ZINC-CONTAINING ZEOLITE

The present invention relates to a platinum- and zinc-containing zeolite and to the use thereof as an oxidation catalyst for purifying the exhaust gases of lean-burn internal combustion engines, in particular diesel engines.

In addition to carbon monoxide CO, hydrocarbons HC and nitrogen oxides $NO_x$, the raw exhaust gas of diesel engines contains a relatively high oxygen content of up to 15% by volume. Additionally, particulate emissions are included which predominantly consist of soot residues and in some cases of organic agglomerates and result from a partially incomplete combustion of fuel in the cylinder.

While carbon monoxide and hydrocarbons can be rendered harmless by means of diesel oxidation catalysts, diesel particulate filters with and without catalytically active coating are suitable for removing the particle emissions. Nitrogen oxides can, for example, be converted to nitrogen by selective catalytic reduction (SCR) on a so-called SCR catalyst with ammonia as reducing agent. Ammonia can be made available by thermolysis and hydrolysis of an ammonia precursor compound fed into the exhaust gas. Examples of such precursor compounds are ammonium carbamate, ammonium formate and preferably urea. Alternatively, the ammonia can be formed by catalytic reactions within the exhaust gas.

For the most complete conversion of the nitrogen oxides at the SCR catalytic converter, it may be necessary to feed ammonia in a superstoichiometric amount, which is generally 10 to 20% above the stoichiometric amount. This in turn leads to unreacted ammonia in the exhaust gas, which is undesirable in view of its toxic effects and its greenhouse gas properties. Consequently, ammonia emissions in exhaust gas legislation are increasingly limited.

So-called ammonia slip catalysts (ASC) have already been developed to avoid ammonia emissions. These catalysts usually comprise an oxidation catalyst for oxidation of ammonia at the lowest possible temperatures.

Such oxidation catalysts generally comprise a noble metal, such as, for example, palladium and in particular platinum, on a carrier oxide. However, they have the disadvantage of oxidizing ammonia, not only to nitrogen, water, and oxygen, but also to harmful species, such as dinitrogen oxide ($N_2O$), nitrogen monoxide (NO) and nitrogen dioxide ($NO_2$).

It is known to improve the selectivity of the ammonia oxidation relative to nitrogen by combining the oxidation catalyst with an SCR catalyst. As a rule, in this case the components are present in a layer arrangement, wherein the SCR layer normally forms the upper layer and is arranged on the oxidation layer below. ASC catalysts are usually applied to a monolithic carrier substrate, for example a flow-through substrate or a wall-flow filter. ASC catalysts of this type are known, for example, from EP410440A1, WO02/100520A1, EP2117702A2 and WO2010/062730A2.

However, there is still a need for ASC catalysts which, with good selectivity with respect to nitrogen, have good thermal stability and, in particular, form only a small amount of $N_2O$. Surprisingly, it has now been found that zeolites comprising platinum and zinc have the required properties.

Platinum-impregnated Zn-ZSM-5 nanocatalysts are described in Catalysis Letters 148(2), June 2018, for isomerization reactions of xylenes. Platinum and zinc-containing zeolites of structure type LTA for oxidation of ethane are disclosed in the Journal of Energy Chemistry, volume 30, March 2019, pages 42-48.

US2018/280945 discloses ammonia slip catalysts comprising a zeolite which comprises zinc incorporated into the zeolite framework.

GB2552262A also discloses zeolites containing zinc incorporated into the zeolite skeleton. These products are used as oxidation catalysts for stoichiometrically operated natural gas engines.

DE1545293 discloses a method for preparing previously hydroformed hydrocarbons. In this method, platinum and zinc-containing zeolites of the structure type "zeolite A" and erionite can be used as catalysts. However, the document does not provide any information on the SAR value of these zeolites. EP2604590A1 relates to a process for producing unsaturated hydrocarbons and discloses, as catalysts, inter alia a zeolite of structure type MFI on which platinum and zinc are present. The zeolites used have very high SAR values. JP2013-163647A relates to a similar subject matter to EP2604590A1, wherein zeolites of structure type MFI, FER and BEA are used as zeolites.

The present invention relates to a zeolite comprising zinc and platinum and being selected from the group consisting of zeolites of the structure types AEI, AFX, BEA, CHA, ERI, FER, KFI, LEV and MFI, wherein the zinc (i) is present as zinc cation in ion-exchanged form in the zeolite structure and/or (ii) as zinc oxide in the zeolite structure and/or on the surface of the zeolite structure, and wherein the zeolite has a SAR (silica-to-alumina ratio) value of 2 to 1000.

Zeolites are two- or three-dimensional structures, the smallest structures of which are $SiO_4$ and $AlO_4$ tetrahedra. These tetrahedra come together to form larger structures, wherein two are connected each time via a common oxygen atom. Rings of different sizes can be formed, for example rings of four, six or even nine tetrahedrally coordinated silicon or aluminum atoms. The various zeolite types are often defined by the largest ring size, because such size determines which guest molecules can and cannot penetrate the zeolite structure. It is customary to differentiate between large-pore zeolites with a maximum ring size of 12, medium-pore zeolites with a maximum ring size of 10, and small-pore zeolites with a maximum ring size of 8.

Zeolites are further divided into structure types by the Structural Commission of the International Zeolite Association, each of which is assigned a three-letter code; see for example Atlas of Zeolite Framework Types, Elsevier, 5th edition, 2001.

Preferred zeolites are selected from the group consisting of zeolites of the structure types AEI, AFX, CHA and FER.

A very preferred zeolite belongs to the structure types AEI.

Another very preferred zeolite belongs to the structure types AFX.

Another very preferred zeolite belongs to the structure types CHA.

Another very preferred zeolite belongs to the structure types FER.

The zeolite according to the invention has, in particular, a SAR (silica-to-alumina ratio) value of 2 to 500, preferably of 2 to 100 and particularly preferably of 5 to 50.

In the context of the present invention, the term "zeolite" expressly does not include mixed oxides comprising aluminum oxide and silicon oxide, as described in the literature, for example, as "$SiO_2/Al_2O_3$".

The platinum in the zeolite according to the invention is preferably present as platinum cation in the zeolite structure, that is to say in ion-exchanged form. However, it may also be wholly or partly present as platinum metal and/or as platinum oxide in the zeolite structure and/or on the surface of the zeolite structure.

The platinum may be present in amounts of 0.01 to 20% by weight based on the sum of the weights of zeolite, zinc and platinum and calculated as zinc metal and platinum metal.

The platinum is preferably present in amounts of 0.5 to 10, particularly preferably 0.5 to 6% by weight, and very particularly preferably 0.5 to 5% by weight, based on the sum of the weights of zeolite, zinc and platinum and calculated as zinc metal and platinum metal.

In the zeolite (i) according to the invention, the zinc is present as zinc cation in ion-exchanged form in the zeolite structure and/or (ii) as zinc oxide in the zeolite structure and/or on the surface of the zeolite structure. This means, in particular, that the zinc according to the present invention is not part and not a component of the zeolite framework. The zinc may be present in amounts of 0.01 to 20% by weight based on the sum of the weights of zeolite, zinc and platinum and calculated as zinc metal and platinum metal. The zinc is preferably present in amounts of 0.5 to 10, particularly preferably 0.5 to 6% by weight, and very particularly preferably 0.5 to 5% by weight, based on the sum of the weights of zeolite, zinc and platinum and calculated as zinc metal and platinum metal.

The zeolite of the material A preferably has a mass ratio of platinum:zinc of 10:1 to 1:17, particularly preferably 6:1 to 1:10 and very particularly preferably 1:2 to 1:7, wherein platinum is calculated as platinum metal and zinc as zinc metal.

The zeolite according to the invention can be produced according to methods known per se. For example, it is obtained by impregnating a zeolite, which is present, for example, in the H or $NH_4$ form, with an aqueous solution of a mixture of platinum and zinc salts in the corresponding amounts according to the incipient wetness method and subsequent drying and calcination. Platinum nitrate (Pt $[NO_3]_2$), in particular, is considered as water-soluble platinum salt, and, in particular zinc acetate ($Zn[Ac]_2$) is considered as water-soluble zinc salt. Calcination of the impregnated zeolite takes place in particular at temperatures of 250 to 550° C.

In an alternative process, an aqueous suspension of a zeolite is admixed with a platinum salt, for example Pt-TEAH (tetraethylammonium), at alkaline pH values, so that the platinum can be adsorbed on the zeolite. An acidic pH value is then adjusted and zinc is added, for example, in the form of zinc acetate.

In a preferred embodiment of the present invention, the zeolite according to the invention is present on a carrier substrate.

Accordingly, the present invention also relates to a catalyst comprising a carrier substrate of length L and a zeolite which comprises zinc and platinum and which is selected from the group consisting of zeolites of structure types AEI, AFX, BEA, CHA, ERI, FER, KFI, LEV and MFI, wherein the zinc (i) is present as zinc cation in ion-exchanged form in the zeolite structure and/or (ii) as zinc oxide in the zeolite structure and/or on the surface of the zeolite structure, and wherein the zeolite has a SAR (silica-to-alumina ratio) value of 2 to 1000.

The carrier substrate may be a flow-through substrate or a wall-flow filter. A wall-flow filter is a carrier substrate comprising channels of length L, which extend in parallel between a first and a second end of the wall-flow filter, which are alternately closed at either the first or second end and are separated by porous walls. A flow-through substrate differs from a wall-flow filter in that the channels of length L are open at both ends.

In an uncoated state, wall-flow filters have, for example, porosities of 30 to 80%, in particular 50 to 75%. In the uncoated state, their average pore diameter is, for example, 5 to 30 micrometers.

Generally, the pores of the wall-flow filter are so-called open pores, that is, they have a connection to the channels. Furthermore, the pores are generally interconnected with one another. This enables, on the one hand, easy coating of the inner pore surfaces and, on the other hand, easy passage of the exhaust gas through the porous walls of the wall-flow filter.

Like wall-flow filters, flow-through substrates are known to the person skilled in the art and are available on the market. They consist, for example, of silicon carbide, aluminum titanate, or cordierite.

In one embodiment of the catalyst according to the invention, the zeolite comprising zinc and platinum is present in the form of a coating on the carrier substrate. The coating may thereby extend over the entire length L of the carrier substrate or only over a section thereof. In both cases, the carrier substrate can also carry one or more further catalytically active coatings.

In the case of a wall-flow filter, the coating may be situated on the surfaces of the inlet channels, on the surfaces of the outlet channels, and/or in the porous wall between the inlet and outlet channels.

Catalysts according to the invention in which the zeolite comprising zinc and platinum is present in the form of a coating on the carrier substrate can be produced by methods familiar to the person skilled in the art, for example by customary dip-coating methods or by pump and suction coating methods with subsequent thermal post-treatment (calcination). The person skilled in the art is aware that, in the case of wall-flow filters, their average pore size and the average particle size of the materials to be coated can be matched to each other in such a manner that they lie on the porous walls that form the channels of the wall-flow filter (on-wall coating). The mean particle size of the materials to be coated can also be selected such that they are located in the porous walls that form the channels of the wall-flow filter; i.e., that the inner pore surfaces are coated (in-wall coating). In this case, the average particle size of the coating materials must be small enough to penetrate into the pores of the wall-flow filter.

In another embodiment of the present invention, the carrier substrate is formed from the zeolite, comprising zinc and platinum, and also a matrix component.

Carrier substrates, flow-through substrates and wall-flow substrates that do not just consist of inert material, such as cordierite, but additionally contain a catalytically active material are known to the person skilled in the art. To produce them, a mixture consisting of, for example, 10 to 95% by weight of an inert matrix component and 5 to 90% by weight of catalytically active material is extruded according to methods known per se. All of the inert materials that are also otherwise used to produce catalyst substrates can be used as matrix components in this case. These are, for example, silicates, oxides, nitrides, or carbides, wherein in particular magnesium aluminum silicates are preferred.

In some embodiments of the present invention, the extruded carrier substrate the zeolite, which comprises zinc and platinum, may be coated with one or more catalytically active coatings.

In another embodiment of the present invention, a carrier substrate composed of corrugated sheets of inert materials is used. Such carrier substrates are known as "corrugated substrates" to those skilled in the art. Suitable inert materials are, for example, fibrous materials having an average fiber diameter of 50 to 250 μm and an average fiber length of 2 to 30 mm. Preferably, fibrous materials are heat-resistant and consist of silicon dioxide, in particular glass fibers. For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, uncorrugated (i.e. flat) sheets can be arranged between the corrugated sheets.

Substrates made of corrugated sheets can be coated directly with the zeolite comprising zinc and platinum, but they are preferably first coated with an inert material, for example titanium dioxide, and only then with the catalytic material.

The catalyst according to the invention, in which the zeolite comprising zinc and platinum is present in the form of a coating on a carrier substrate, can be used as such as an ammonia slip catalyst.

The present invention thus also relates to a method for oxidizing the ammonia contained in an exhaust gas flow, characterized in that the exhaust gas flow is passed over a catalyst according to the invention.

Furthermore, the present invention also comprises a device for purifying exhaust gases of a diesel engine which comprises a catalyst according to the invention.

In addition to the catalyst according to the invention, the device according to the invention comprises in particular an SCR catalyst.

EXAMPLE 1

First, a mixed platinum nitrate/zinc acetate solution is produced, the volume of which corresponds to 50 percent water absorption of the zeolite (a commercially available zeolite of the structure type CHA). Based on the final composition of the platinum and zinc-containing zeolite, 0.42% by weight platinum and 0.07% by weight zinc (mass ratio Pt:Zn=6:1) are applied to the zeolite in a mechanical mixer. The subsequent thermal treatment comprises drying at 120° C., calcination at 350° C. and annealing at 550° C. in air.

In the subsequent washcoat preparation, 10% of a commercially available aluminum oxide sol (based on the total loading) is added and a thus a commercially available carrier substrate made of ceramic is coated with a washcoat load of 25 g/l, which is ultimately dried at 120° C., calcined at 350° C. and tempered at 550° C.

The catalyst obtained is referred to below as K1.

EXAMPLE 2

Example 1 is repeated with the difference that the amount of zinc is 0.2% by weight (mass ratio Pt:Zn=2:1). The catalyst obtained is referred to below as K2.

EXAMPLE 3

Example 1 is repeated with the difference that the amount of zinc is 0.6% by weight (mass ratio Pt:Zn=1:1.5). The catalyst obtained is referred to below as K3.

EXAMPLE 4

Example 1 is repeated with the difference that the amount of zinc is 2.64% by weight (mass ratio Pt:Zn=1:6.6). The catalyst obtained is referred to below as K4.

COMPARATIVE EXAMPLE 1

Example 1 is repeated with the difference that no zinc is used. The catalyst obtained is referred to below as VK1.

EXAMPLE 5

A commercially available zeolite of structure type CHA is initially provided in water and the pH is adjusted to 10. Pt-TEAH is then added and the suspension is stirred for 24 h. Subsequently, the pH is adjusted to 6, zinc acetate and 10% aluminum oxide sol are added. The mass ratio Pt:Zn was 1:1.7. Following linear grinding, a commercially available carrier substrate made of ceramic is subsequently coated with a washcoat quantity of 25 g/l. The final temperature treatment in air comprises drying at 120° C. and calcination and tempering at 350 and 550° C. The total noble metal concentration on the final catalyst (hereinafter referred to as K5) is 0.42% by weight.

COMPARATIVE EXAMPLE 2

Example 5 is repeated with the difference that, after addition of Pt-TEAH, the mixture is stirred for 20 h and no zinc is used. The catalyst obtained is referred to below as VK2.

Determination of the $NH_3$ light off and the $N_2O$ formation a) Aging

From catalysts K1 to K5 and VK1 and VK2, 4 drill cores each were cut, of which two were measured in a fresh state and two following hydrothermic aging (10% $H_2O$, 10% $O_2$, residue $N_2$) in an oven for 16 hours at 800° C. (given below as: 16H800).

b) Test Conditions in the Laboratory Reactor

In a laboratory reactor, a synthetic test exhaust gas consisting of 300 ppm $NH_3$, 5% $O_2$, 5% $H_2O$, residue $N_2$ (test A or B) or a test exhaust gas consisting of 300 ppm $NH_3$, 200 ppm NO, 5% $O_2$, 5% $H_2O$, residue $N_2$ (test C or D) was passed through the drill cores obtained according to A) at 1950 L/hour. In this case, the temperature of the test exhaust gas after a conditioning phase (~30 K/min of 150 to 600° C. in 5% $O_2$, residue $N_2$) was increased at 10 K/min from 150° C. to 600° C., and the $NH_3$ reaction was determined by means of a conventional method.

c) Results

The following tables show the results obtained:

TABLE 1

| Test A: fresh, only $NH_3$ | K1 | K2 | K3 | K4 | VK1 | K5 | VK2 |
|---|---|---|---|---|---|---|---|
| $NH_3$ T50/° C. | 222 | 221 | 220 | 218 | 228 | 208 | 220 |
| $NH_3$ conversion (350° C.)/% | 99 | 99 | 99 | 99 | 99 | 99 | 98 |
| $NH_3$ conversion (550° C.)/% | 99 | 99 | 99 | 100 | 100 | 100 | 99 |

TABLE 1-continued

| Test A: fresh, only $NH_3$ | K1 | K2 | K3 | K4 | VK1 | K5 | VK2 |
|---|---|---|---|---|---|---|---|
| NO formation (210-400° C.)/ppm | 79 | 70 | 77 | 89 | 65 | 113 | 70 |
| NO formation (550° C.)/ppm | 206 | 200 | 206 | 235 | 196 | 225 | 202 |
| $N_2O$ formation (210-400° C.)/ppm | 44 | 48 | 48 | 48 | 47 | 35 | 44 |
| $N_2O$ formation max./ppm | 81 | 86 | 85 | 86 | 87 | 66 | 79 |

TABLE 2

| Test B: 16H800, only $NH_3$ | K1 | K2 | K3 | K4 | VK1 | K5 | VK2 |
|---|---|---|---|---|---|---|---|
| $NH_3$ T50/° C. | 209 | 207 | 205 | 203 | 210 | 194 | 202 |
| $NH_3$ conversion (350° C.)/% | 97 | 97 | 97 | 97 | 97 | 95 | 97 |
| $NH_3$ conversion (550° C.)/% | 98 | 98 | 98 | 98 | 98 | 95 | 98 |
| NO formation (210-400° C.)/ppm | 124 | 125 | 128 | 133 | 125 | 155 | 135 |
| NO formation (550° C.)/ppm | 252 | 252 | 251 | 257 | 254 | 265 | 254 |
| $N_2O$ formation (210-400° C.)/ppm | 34 | 34 | 33 | 32 | 35 | 25 | 31 |
| $N_2O$ formation max./ppm | 54 | 55 | 53 | 47 | 54 | 44 | 51 |

TABLE 3

| Test C: fresh, $NH_3$ + NO | K1 | K2 | K3 | K4 | VK1 | K5 | VK2 |
|---|---|---|---|---|---|---|---|
| $NH_3$ T50/° C. | 206 | 202 | 203 | 198 | 206 | 209 | 210 |
| $NH_3$ conversion (350° C.)/% | 99 | 99 | 99 | 99 | 99 | 99 | 99 |
| $NH_3$ conversion (550° C.)/% | 99 | 100 | 99 | 100 | 100 | 100 | 100 |
| NO formation (210-400° C.)/ppm | 192 | 175 | 186 | 200 | 168 | 238 | 195 |
| NO formation (550° C.)/ppm | 364 | 354 | 363 | 403 | 346 | 389 | 384 |
| $N_2O$ formation (210-400° C.)/ppm | 77 | 82 | 83 | 82 | 84 | 59 | 75 |
| $N_2O$ formation max./ppm | 149 | 160 | 157 | 162 | 159 | 119 | 138 |

TABLE 4

| Test D: 16H800, $NH_3$ + NO | K1 | K2 | K3 | K4 | VK1 | K5 | VK2 |
|---|---|---|---|---|---|---|---|
| $NH_3$ T50/° C. | 214 | 213 | 214 | 215 | 217 | 212 | 214 |
| $NH_3$ conversion (350° C.)/% | 96 | 97 | 97 | 97 | 96 | 95 | 97 |
| $NH_3$ conversion (550° C.)/% | 98 | 98 | 98 | 98 | 97 | 96 | 98 |
| NO formation (210-400° C.)/ppm | 269 | 270 | 273 | 279 | 268 | 304 | 296 |
| NO formation (550° C.)/ppm | 434 | 433 | 433 | 440 | 432 | 453 | 461 |
| $N_2O$ formation (210-400° C.)/ppm | 60 | 60 | 57 | 55 | 60 | 42 | 49 |
| $N_2O$ formation max./ppm | 105 | 105 | 102 | 94 | 102 | 83 | 91 |

The test results show that, as a function of the zinc content of the inventive catalysts K1 to K4 or K5, the light off temperatures for ammonia fall compared to the comparative catalysts VK1 and VK2 containing platinum only. Although this higher activity leads to a higher NO formation, it leads to a lower rather than a higher $N_2O$ formation. The addition of zinc thus leads to a higher NO selectivity and a lower $N_2O$ selectivity. However, the higher NO selectivity is not disadvantageous since NO can be converted by an SCR layer to nitrogen and oxygen.

The invention claimed is:

1. A zeolite comprising zinc and platinum and being selected from the group consisting of zeolites of the structure types AEI, AFX, BEA, CHA, ERI, FER, KFI, LEV and MFI, wherein the zinc (i) is present as zinc cation in ion-exchanged form in the zeolite structure and/or (ii) as zinc oxide in the zeolite structure and/or on the surface of the zeolite structure, and wherein the zeolite has a SAR (silica-to-alumina ratio) value of 2 to 1000.

2. The zeolite according to claim 1, wherein it is selected from the group consisting of zeolites of structure types AEI, AFX, CHA and FER.

3. The zeolite according to claim 1, wherein it belongs to structure type AEI.

4. The zeolite according to claim 1, wherein belongs to structure type AFX.

5. The zeolite according to claim 1, wherein it belongs to the structure type CHA.

6. The zeolite according to claim 1, wherein it belongs to structure type FER.

7. The zeolite according to claim 1, wherein the zeolite has an SAR (silica-to-alumina molar ratio) value of 2 to 500.

8. The zeolite according to claim 1, wherein the zeolite has an SAR (silica-to-alumina ratio) value of 2 to 100.

9. The zeolite according to claim 1, wherein the zeolite has an SAR (silica-to-alumina ratio) value of 2 to 50.

10. The zeolite according to claim 1, wherein the platinum is present in amounts of 0.01 to 20% by weight, based on the sum of the weights of zeolite, zinc and platinum and calculated as zinc metal and platinum metal.

11. The zeolite according to claim 1, wherein the zinc is present in amounts of 0.01 to 20% by weight, based on the sum of the weights of zeolite, zinc and platinum and calculated as zinc metal and platinum metal.

12. The zeolite according to claim 1, wherein the mass ratio of platinum:zinc is from 6:1 to 1:7, with platinum calculated as platinum metal and zinc as zinc metal.

13. A catalyst comprising a carrier substrate of length L and a zeolite according to claim 1.

14. A method for the oxidation of ammonia contained in an exhaust gas stream, wherein the exhaust gas flow is conducted over a zeolite according to claim 1.

15. A device for purifying the exhaust gases of diesel engines, which comprises a catalyst according to claim 13.

16. A method for the oxidation of ammonia contained in an exhaust gas stream, wherein the exhaust gas flow is conducted over a catalyst according to claim 13.

17. The zeolite according to claim 1, wherein the zinc is present as zinc cation in ion-exchanged form in the zeolite structure.

18. The zeolite according to claim 1, wherein the zinc is present as zinc oxide in the zeolite structure and/or on the surface of the zeolite structure.

19. The zeolite according to claim 1, wherein the platinum (i) is present as platinum cation in ion-exchanged form in the zeolite structure and/or (ii) as platinum metal and/or platinum oxide in the zeolite structure and/or on the surface of the zeolite structure.

20. The zeolite according to claim 1, wherein the zeolite structure is limited to one or more selected from the group consisting of AEI, AFX, BEA, CHA, ERI, and FER.

* * * * *